United States Patent [19]
Schmidt et al.

[11] Patent Number: 6,018,797
[45] Date of Patent: Jan. 25, 2000

[54] INTEGRATED RELAY LADDER LANGUAGE, REDUCED INSTRUCTION SET COMPUTER

[75] Inventors: Otomar Schmidt, Richmond Heights; Richard S. Gunsaulus, Highland Heights; Ronald E. Schultz, Solon; Jeffery W. Brooks, Mentor-On-The-Lake, all of Ohio

[73] Assignee: Allen-Bradley Company, LLC, Milwaukee, Wis.

[21] Appl. No.: 08/987,033

[22] Filed: Dec. 9, 1997

Related U.S. Application Data

[60] Provisional application No. 60/032,926, Dec. 9, 1996.

[51] Int. Cl.[7] .................................................. G06F 15/78
[52] U.S. Cl. ........................... 712/42; 712/234; 364/147
[58] Field of Search ................................. 364/147, 130, 364/188; 395/562, 564, 570, 580, 384, 800.41, 800.43, 707; 712/221, 223, 229, 233, 208, 41, 43, 32, 33, 38, 42, 226, 203, 234; 345/519; 708/100, 233

[56] References Cited

U.S. PATENT DOCUMENTS

| | | | |
|---|---|---|---|
| 5,495,588 | 2/1996 | Gibart et al. | 395/379 |
| 5,504,902 | 4/1996 | McGrath et al. | 395/707 |
| 5,508,909 | 4/1996 | Maxwell et al. | 364/147 |
| 5,715,439 | 2/1998 | Schmidt et al. | 395/570 |
| 5,844,795 | 12/1998 | Johnston et al. | 364/188 |

OTHER PUBLICATIONS

Koo et al., "An Architecture of the RISC Processor for Programmable Controllers", Industrial Electronics, Control and Instrumentation, 1994, IECON '94, p:1179–83, 1994.

*Primary Examiner*—John A. Follansbee
*Attorney, Agent, or Firm*—Keith M. Baxter; John M. Miller; John J. Horn

[57] ABSTRACT

An integrated RISC and relay ladder logic processor uses shared registers, program counter, bus lines, and processing circuitry to eliminate delays associated with transfer of control in co-processor type architecture. The RISC instructions do not significantly interfere with the specialized hardware needed for rapid relay logic execution, the latter which may be further improved through the use of a pipeline well suited for relay ladder logic which creates few pipeline hazards. Two levels of condition codes are used for the arithmetic and logic instructions to permit nested arithmetic operations without interference with those instructions visible to the user. Hybrid instructions are provided to synchronize the relay ladder instructions with the arithmetic instructions, thus truly integrating the two instruction sets.

15 Claims, 3 Drawing Sheets

| INSTR. | CLOCK CYCLE # | | | | | |
|---|---|---|---|---|---|---|
| | 1 | 2 | 3 | 4 | 5 | 6 |
| X1C1 | F<br>PC + 4 | D | E | | | |
| X1C2 | | F<br>PC + 8 | D | E | | |
| X1C3 | | | F<br>PC + 12 | D | E | |
| X1C4 | | | | F<br>PC + 16 | D | E |

FIG. 3

INTEGRATED RELAY LADDER LANGUAGE, REDUCED INSTRUCTION SET COMPUTER

CROSS-REFERENCE TO RELATED APPLICATIONS

This application is based on prior provisional application serial number 60/032,926 filed on Dec. 9, 1996, and claims any right of priority thereon.

STATEMENT REGARDING FEDERALLY SPONSORED RESEARCH OR DEVELOPMENT

BACKGROUND OF THE INVENTION

The invention relates to industrial controllers for use in controlling industrial processes, and in particular to an integrated circuit processor for use in such industrial controllers and capable of executing both a reduced instruction set of general purpose arithmetic and logical instructions and specialized relay ladder language instructions with one set of architectural components including the program counter, registers and data lines.

Industrial controllers are special purpose computers used for controlling an industrial process, such as an assembly line, in real-time in accordance with a stored program. Under the direction of a stored program, the industrial controller examines a series of inputs reflecting the status of the industrial process and changes a series of outputs controlling the industrial process.

Industrial controllers are typically programmed in a "relay ladder" language. This language, which has became an accepted standard in industry, employs instructions represented by "contacts" and "coils" of virtual relays connected in ladder like "rungs". A relatively small number of basic ladder logic instructions allows the construction of complex control programs. The core instructions include XIC ("examine if closed"), XIO ("examine if open"), and OTE ("output enable"). The former two instructions check the state of a binary input and are graphically represented by either normally open or normally closed contacts in the relay ladder diagram. The latter instruction identifies the state of an output and is graphically represented by a coil. Other "coil" instructions include the OTL instruction ("output latch") and OTU ("output unlatch").

Each of these "contact" instructions reads a bit in memory which may represent the state of a physical signal in the industrial process as updated by I/O circuitry and according to the logic of the instruction (e.g., XIC or XIO) sets or resets a "rung flag" as the rung is traversed. Depending on the topology of the rung when a coil instruction is reached at the end of the rung, the state of the rung flag indicates whether the output should be enabled or not. The "coil" instruction outputs this state to another bit in memory as may be communicated to the controlled process by the I/O circuitry.

In a common relay ladder program, a specialized processor will read each of the rungs (composed of contacts and coils) in sequence to examine contacts and to generate an output via the coil. Each rung is executed in a consistent order at high speed until the completion of all rungs. Then there may be a period of refreshing of the I/O data, and the rungs will again be executed. High speed execution of the rungs provides the appearance that they execute in parallel as would be the case with true relays and as is essential to the fundamental operation of any real-time control program. A delay or unpredictability in the execution of the control program may have a detrimental effect on the industrial process either causing it to fail or to run erratically. Relay ladder instructions may be executed quickly on simple hardware and provide an intuitive language for control processes.

With the increasing overlap between the technologies of industrial controllers and conventional computers, industrial controllers have been designed to execute arithmetic and logical instructions normally reserved for conventional computers. These instructions include for example, addition, subtraction, multiplication and Boolean instructions such as AND, OR and XOR as well as branching instructions for the generation of loops and the like. Some of these instructions, such as the Boolean instructions, are redundant with relay ladder instruction, that is, they offer no new capability for the controller but simply a choice of instructions.

One way to provide a controller that may execute both computer-like and relay ladder instructions is through the use of a conventional micro-processor and special software simulating the relay ladder instructions through the use of conventional arithmetic and logic instructions. These machines are often known as "soft PLCs" reflecting the fact that they perform some of the tasks normally associated with a programmable logic controller (an industrial controller). The soft PLC approach has the disadvantage that it is relatively slow in its execution of relay ladder logic instructions because of the necessary interpretation of these instructions into arithmetic and logical instructions general microprocessors and because of their lack of specialized hardware which may take advantage of the natural efficiencies of relay ladder language programming.

A preferred approach to providing computer-like instructions in an industrial controller is through the use of two processors, one dedicated to relay ladder processing and the other to general purpose arithmetic and logical instructions. In such a machine, one processor acts as a co-processor to the other with the task of executing the control program being passed off to the machine capable of executing the particular instruction at hand. This use of both a general purpose processor and a specialized relay language processor operating together to execute a control program is described in U.S. patent Ser. No. 08/154,232 filed Nov. 18, 1993 and entitled: "High Speed Relay Language Processor" assigned to the assignee of the present invention and hereby incorporated by reference. In this patent, a co-processor relationship is described where the relay language processor may transfer control for a number of instructions to a general purpose processor. The general purpose processor, upon completion of its assigned instructions, returns control to the relay language processor. Because the preponderance of instructions of a real-time control program will be in relay ladder instructions, the general purpose processor is run as a co-processor subservient to the relay language processor.

This dual processor approach is not without its problems, the most notable of which is the time required to transfer responsibility for executing the control program between two machines. In U.S. Ser. No. 08/762,650 filed Dec. 9, 1996 and entitled: Bi-Directional Co-Processor Interface" this problem is addressed by the use of a shared stack. Variables needed for the execution of the program may be placed in the stack to be used by either of the two processors eliminating the time consuming process of transferring these variables back and forth between the registers of two machines. This patent also is assigned to the assignee of the present invention and hereby incorporated by reference.

It would be desirable to provide a means of executing both general purpose computer arithmetic and logical instructions and relay ladder instructions with minimized overhead in transferring control between two machines while allowing high speed processing of relay ladder instructions as requires dedicated hardware.

BRIEF SUMMARY OF THE INVENTION

The present inventors have recognized that a reduced instruction set computer ("RISC") could be combined with a specialized relay ladder machine, eliminating the need for the transfer of control between two machines but still allowing high speed execution of relay ladder instructions. In a RISC machine, the processor architecture remains relatively simple, providing improved execution speed that makes up for a lack of a rich instruction. This simple hardware of a RISC computer permits it to be combined with the relay ladder circuitry, to share memory lines, registers and program counter, while avoiding complexity that may slow execution.

The inventors have further recognized that the slight adverse effect on execution speed caused by the introduction of the arithmetic and logical instruction can be offset by the use of pipeline architecture in which multiple instructions are simultaneously fetched, decoded and executed. Although pipeline architecture is well known for use in general processors, it is uniquely well suited to relay language programs where there is often relatively little if any branching and therefore few "pipeline hazards" which slow execution. Pipeline hazards are situations in which data needed for a downstream instruction in the pipeline has not yet been resolved upstream or where there is an unresolved branch in the program.

Thus through a combination of a RISC and pipeline architecture, a practical combination arithmetic/logic/relay ladder processing machine can be constructed sharing most architectural components and eliminating the need for the transfer of control between two processing engines.

Specifically, the present invention provides an integrated circuit electronic computer having address and data lines connectable to memory external to the integrated circuit for exchanging data on the data lines at a memory address corresponding to an address on the address lines. The integrated circuit electronic computer also includes an instruction decoding circuit attached to the data lines for receiving instructions therefrom and providing decoded instruction signals. A plurality of storage registers communicate with the address and data lines and the instruction decoding circuit to receive and transmit data from and to the data lines. An arithmetic/logic/relay ladder unit is connected to the storage registers, the data lines and the instruction decoding circuit for receiving data from at least one register to operate on that data, according to an instruction signal, to produce an output. The arithmetic/logic/relay ladder unit operates on the data according to different instruction signals to execute arithmetic instructions, logic instructions and relay ladder instructions.

Thus it is one object of the invention to provide a single architecture capable of executing arithmetic, logical and relay ladder instructions without the need for duplicative processing elements such as instruction decoders and registers. By eliminating the separate architectures for these different instruction types, savings in circuitry space may be realized and speed of performance may be increased by eliminating the need for cumbersome transfer of execution control signals and data between the two architectures.

It is yet another object of the invention to integrate arithmetic and logical instructions with relay ladder instructions without significantly affecting the efficiency of the processor in executing relay ladder instructions. By combining the relay ladder instruction executing capability with a reduced set of arithmetic and logic instructions, the architecture may retain its high speed performance.

The instruction decoding circuit may be a portion of an instruction pipeline providing control signals for simultaneous fetching of a first instruction over the data lines, decoding a second instruction to produce an instruction signal and executing a third instruction by the arithmetic/logic/relay unit.

Thus it is another object of the invention to recapture any speed lost in the combination arithmetic/logic/relay ladder unit through the use of pipelining techniques which provide speed gains for relay ladder logic execution beyond that normally obtainable with programs constructed of standard arithmetic/logic instructions.

Included in the instructions that may be executed by the arithmetic/logic/relay ladder unit are hybrid instructions which overlap between arithmetic/logic instructions and relay ladder instructions. Specifically the integrated circuit electronic computer may further include a program counter communicating with the address lines to provide a fetch address from the external memory where a next instruction will be found. The program counter is conditionally altered in response to an instruction signal from the instruction decode circuitry to produce a branch in execution of instructions, and the condition is based on the output of the arithmetic/logic/relay ladder unit executing an earlier relay ladder instruction.

Alternatively, or in addition, the instruction decode circuitry may communicate an instruction signal to a register causing the register to conditionally provide data to the data lines for storage in the external memory based on the output of the arithmetic/logic/relay ladder unit from an earlier relay ladder instruction.

Thus it is another object of the invention to provide for the creation of hybrid instructions in which the arithmetic/logical operations may be linked to the execution of relay ladder logic instructions. Such hybrid instructions are impractical on dual processor machines.

The use of these instructions, one which causes a conditional branch and one which causes a conditional storing of a word based on the execution of a relay ladder rung allows arithmetic/logic instructions to be incorporated into a relay ladder logic program seamlessly or alternatively for the arithmetic/logic instructions to execute independently of the execution of the relay ladder logic instructions as desired by the programmer.

It is another object of the invention to allow for the software generation of higher level language instructions composed of both relay ladder logic instruction primitives and arithmetic/logic primitives. Where two processors are used, combination arithmetic/logic and relay ladder instruction streams would involve a burdensome overhead in switching between the two machines for such instructions.

It is thus another object of the invention to significantly increase the richness of the instruction set which may be built from the reduced instruction set, instructions of the present invention at a compiler level.

The foregoing and other objects and advantages of the invention will appear from the following description. In this description, reference is made to the accompanying drawings which form a part hereof and in which there is shown by way of illustration, the preferred embodiment of the invention. Such embodiment does not necessarily represent the full scope of the invention, however, and reference must be made therefore to the claims for interpreting the scope of the invention.

BRIEF DESCRIPTION OF THE SEVERAL VIEWS OF THE DRAWINGS

FIG. 3 is a chart depicting the execution of a standard relay ladder language program without branches and devoid of pipeline hazards.

DETAILED DESCRIPTION OF THE INVENTION

Figure 1:
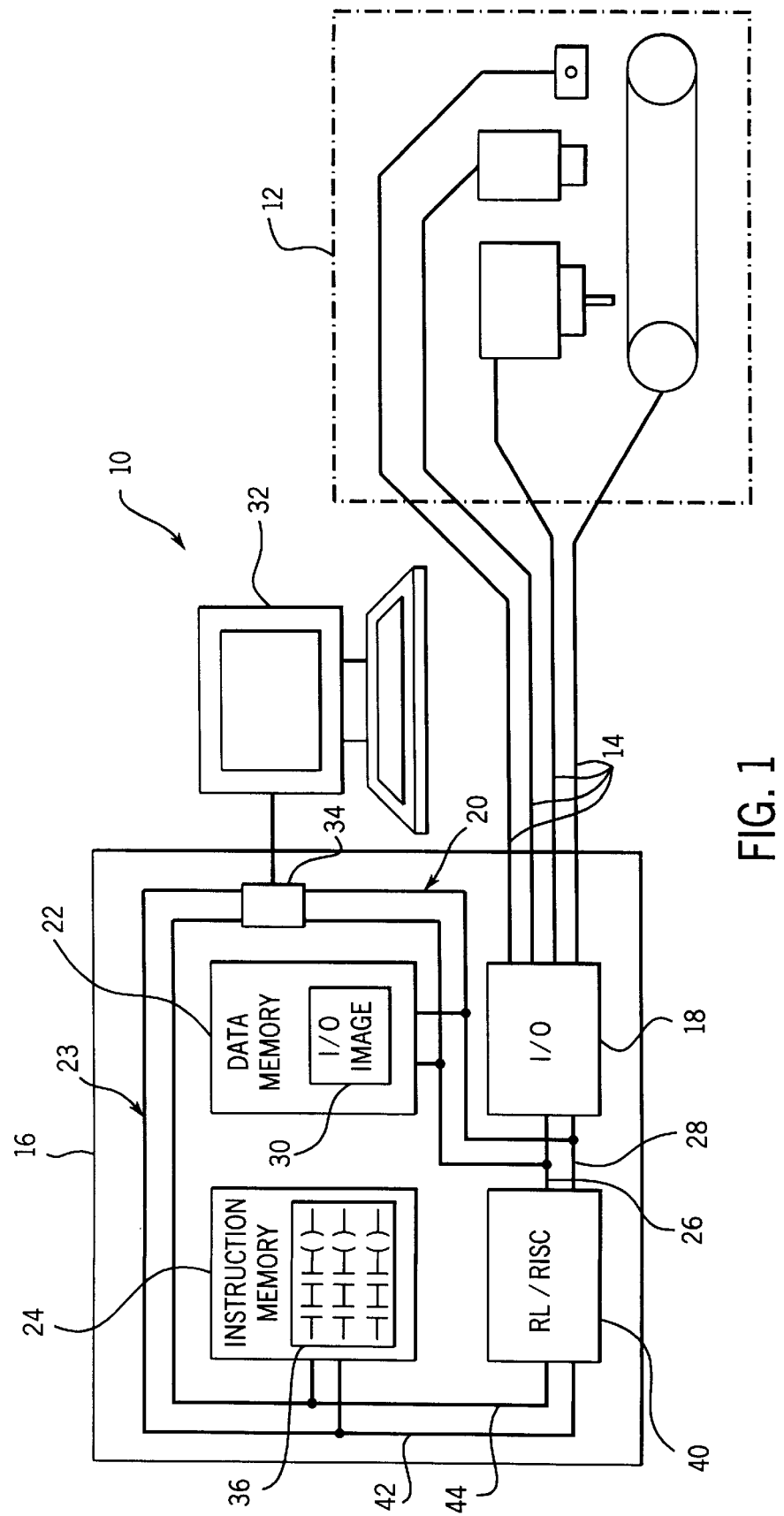
FIG. 1 is a schematic representation of a control system using the relay ladder/RISC processor of the present invention in a preferred Harvard architecture, having separate instruction and data memories, the latter receiving I/O data through an interface from a controlled process.

Referring now to FIG. 1, a control system 10 for controlling an industrial process 12 provides a number of input/output (I/O) lines 14 over which input and output signals may be communicated between the industrial process 12 and a controller 16. The I/O lines 14 are received by I/O interface circuitry 18 which provides an interface between the I/O lines 14 and an internal bus 20 communicating with other components of the controller 16. As is well known in the art, the I/O interface circuitry 18 may be remotely located from the remainder of the controller 16 and may communicate with the controller 16 by an industrial controller network (not shown) being a high speed link well known in the art.

The bus 20 also connects with a data memory 22 and an instruction memory 24 via data lines 26 and address lines 28. The I/O interface circuitry 18 may communicate over the data and address lines 26 and 28 with the data memory 22 to update an I/O image table 30 contained therein. The I/O image table 30 has single bits indicating the state of the various I/O lines 14 (when the I/O lines 14 communicate with discreet I/O points) and multiple bit words of data indicating the state of the various I/O lines 14 (when the I/O lines communicate with analog or other multi-word I/O points). I/O image tables 30 are well known in the industrial controller art. Data memory 22 may also include non-I/O values needed for the control program 36 which, as will be described, may execute arithmetic and logical instructions having intermediate numeric values or the need for other stored constants or data.

A programming terminal 32 may communicate with the controller 16 via a port 34 connected to bus 20 so that I/O data may be input and reviewed. The programming terminal 32 may also communicate with a second bus 23 leading to an instruction memory 24 so that a control program 36 may be loaded into instruction memory 24. The second bus includes instruction lines 42 and address lines 44 operating independently of data lines 26 and address lines 28.

The control program 36 may be formed of conventional relay ladder language instructions as are understood in the art as well as arithmetic and logical instructions typical of a more conventional computer architecture as will be described below.

A relay ladder/reduced instruction set computer (RL/RISC) 40 of the present invention connects to both the instruction memory 24, by means of instruction lines 42 and address lines 44 of bus 23, and to the data memory 22 by means of data lines 26 and address lines 28 of bus 20. Thus the RL/RISC processor 40 thus may simultaneously fetch instructions from the instruction memory 24 and data from the data memory 22 without interference between the instructions and data being read.

Figure 2:
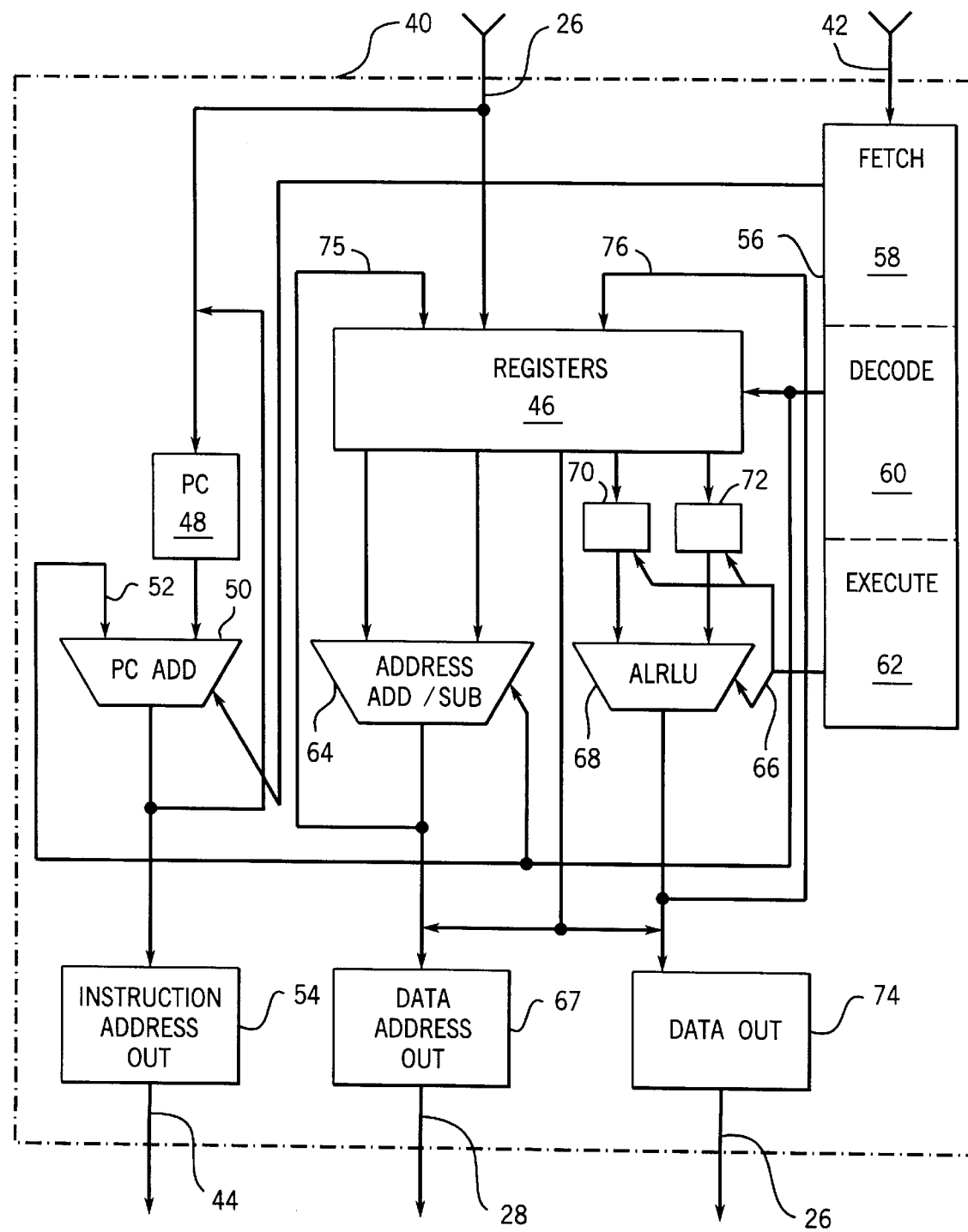
FIG. 2 is a block diagram of the relay ladder/RISC processor of FIG. 1 showing a pipeline for receiving instructions to command an arithmetic/logic/relay ladder unit, shared registers, a program counter and other architecture components in the execution of arithmetic, logic and relay ladder instructions.

Referring now to FIG. 2, the RL/RISC processor 40 connects with instruction lines 42 from the instruction memory to receive instructions and with input data lines 26' to receive data, and output data lines 26 to transmit data. The RL/RISC processor 40 includes address lines 44 for providing addresses to the instruction memory 24 for the next instruction to be obtained and address lines 28 providing addresses to data memory 22 indicating the location of data to be stored, through output data lines 26, or loaded, through input data line 26'.

The input 26' and output data line 26 connect with a set of 32 general purpose and special purpose registers 46 which may temporarily store data prior to loading the data back into memory 22 or using it as an operand in an instruction as will be described. Among the registers 46 are status registers (not shown) which holds typical flags used in an arithmetic processing (e.g., negative, zero, overflow and carry) as well as special user flags as will be described, having identical significance and flags used for relay ladder logic including in particular the rung true flag, which indicates the current status of a rung as it is being evaluated as either current carrying or not current carrying, and various bit stacks, for example for use in rung branches.

Input data line 26' also connects to a program counter 48 being a standard component of computer architecture which provides an address at address lines 44 at which a next instruction will be fetched from instruction memory 24. The connection between the program counter 48 and the data lines 26' allows the program counter 48 to be initialized to the start of the control program 36. The address output by the program counter 48 is connected to a PC adder 50 which adds an offset value 52 to this address so that at the conclusion of the fetching of each instruction, a next instruction may be fetched (the offset dependent on the granularity of the instruction memory 24) or to allow branching of the RL/RISC processor 40 by a variable offset amount decoded from a branch instruction, as will be understood in the art. This summed value provided to an instruction address out register 54 to become the address on address lines 44.

Fetched instructions arriving at instruction lines 42 proceed into a pipeline 56 providing for three stages of execution of the instruction: (1) a fetch stage 58 followed by (2) a decode stage 60 in turn followed by (3) an execution stage 62.

The fetch stage 58 of the pipeline 56 triggers the PC adder 50 to generate the next instruction address and receives that instruction over instruction line 42 for temporary storage.

The instruction thus fetched is then passed to the decode stage 60 while a new instruction is fetched. The decode stage provides temporary storage of the instruction while the operands or other data associated with the instructions are received on input data lines 26' to be held in one of registers 46. At decode stage 60, additional data may be obtained for the ultimate execution of the instruction per control signals communicating with the registers 46 which hold both the original operand received over input data lines 26' (associated with the instruction) and other values such as offsets and base values. For certain addressing modes, the ultimate operand address may be obtained by combining the original operand address with offsets and/or base values stored in the registers 46 by means of address calculator 64 which receives these values from the registers 46 and in response to control signals from the decode stage 60, adds or subtracts offsets and base values from any operand with the instruction to produce a value forwarded to an address output register 67 and ultimately to address lines 28 to obtain additional operand data from the I/O image table 30. Additionally, calculated address should be stored in register 46 via path 75. A value in register 46 may also be used directly as an address out without passing through the address calculator 64. During the final step of the decode stage 60 the necessary operands for the instruction are placed in temporary holding registers 70 and 72.

At an execution stage 62, the instruction with its operand data already collected and placed in registers 70 and 72 is executed by instruction signal 66 communicated to an arithmetic/logic/relay ladder unit (ALRLU) 68 receiving outputs of registers 70 and 72.

In this way, the ALRLU 68 then processes one or both operands per control signals 66 from the execute stage 62 to produce an output provided to an output register 74 and to output data lines 26. Additionally, the ALRU output can be stored back into registers 46 via path 76.

As will be understood to those of ordinary skill in the art, fetching, decoding and executing instructions are steps which must be taken in all computer architectures for the processing of instruction, however, the pipeline 56 allows three different instructions to be simultaneously processed at different stages 58, 60 and 62 as will be described in more detail below. The effect of this pipeline therefore is to increase the speed of execution of the instructions by up to three times.

Referring now to FIGS. 1, 2 and 3, a typical sequence of a control program 36 will involve a set of sequential XIC instructions in which an I/O value from the I/O image table 30 is examined and depending on its state, a rung true flag is changed. The rung true flag may be a bit in a system register being one of registers 46. The logic of changing the rung true flag is such that at the conclusion of rung (i.e., the examination of the I/O points) a determination can be made as to whether a series coil output will be turned on or off. The XIC instructions are normally stored in instruction memory 24 in sequential order.

As depicted, a first instruction XIC1 (where the 1 indicates the operand of the instruction or the point being inspected in the I/O image table 30) is fetched by operation of the fetch stage 58 incrementing the value of the program counter by means of the PC adder 50 to provide an address on address line 44 to the instruction memory 24. The program counter is incremented by four bytes, indicating the number of bytes occupied by an instruction and its operand. This fetching process is indicated in the table of FIG. 3 by the row denoted XIC1 and the column denoted 1 indicating a first clock cycle.

At a second clock cycle, a second instruction XIC2 may be fetched over address lines 44 and instruction lines 42 using the same process of incrementing the program counter 48 (incremented now by a total of eight). This fetching process is indicated in the table of FIG. 3 by the row denoted XIC2 and the column denoted 2 indicating a second clock cycle. At the same time (clock cycle 2) by virtue of the separate bus structures 23 and 20, the first instruction XIC1 may be decoded by the decode stage 60 of pipeline 56 indicated in the table of FIG. 3 by the row denoted XIC1 and the column denoted 2 indicating a second clock cycle. As mentioned this decoding involves collection of the operands needed for the instruction and may require repeated readings and writings of the I/O image table 30 depending on whether the addressing is direct or indirect as is understood in the art.

In a typical case the operands will be obtained in a single clock cycle so that at next clock cycle 3 the instruction XIC1 may be executed by the ALRLU 68 based on the instruction signal 66 from the execution stage 62 of the pipeline 56 as indicated in the row denoted XIC1. The execution of the XIC instruction simply sets a rung true flag in registers 46 indicating the on-going state of the rung and thus presents no conflict with the decoding of the XIC2 instruction and the fetching of an XIC3 instruction at the address of the program counter 48 (now incremented by twelve). This fetching, decoding and execution is indicated in the table of FIG. 3 by column denoted 3 indicating a third clock cycle. This process may be continued with a fourth instruction XIC4 during the fourth clock cycle. Instruction XIC4 may be fetched (at the original program counter value plus sixteen) while the XIC3 instruction is decoded and the XIC2 instruction is executed.

In normal pipeline operation "hazards" may occur, for example, if decoding instruction XIC2 requires a value not yet available because it requires completion of a prior instruction. The direct addressing and lack of branching typical of relay ladder language programs eliminates most pipeline hazards allowing substantial speed benefits of up to three times from the pipeline structure described. Further the use of the Harvard architecture as described with separate bus structures for the data memory 22 and instruction memory 24 prevent conflicts during the execution of multiple instructions, for example, the instructions XIC1 and XIC2 during clock cycle two where decoding of the operands and fetching of the next instruction must occur simultaneously. Separate memories prevent a conflict in these operations.

Referring now to FIG. 2, the ALRLU 68 executes a number of instructions that may be grouped into four types: relay ladder, arithmetic/logic, branches, and load/store instructions. All but the first instruction group are typically associated with general purpose processors. Generally all instructions executing one clock cycle if there is no memory access or branches not taken, two clock cycles for all direct memory accesses and branches that are taken and four clock cycles for indirect memory accesses.

The set of relay logic instructions indicated in Table I.

TABLE I

| RELAY LOGIC INSTRUCTIONS | EXPLANATION |
| --- | --- |
| XIC | Examine Input Closed |
| XIO | Examine Input Open |
| OTL | Output Latch |
| OTU | Output Unlatch |
| OTE | Output Energize |
| TON | Timer ON |
| TOF | Timer OFF |
| RTO | Retentive Timer ON |
| RES | Reset Time/Counter |
| CTU | Counter UP |
| CTD | Counter Down |
| BST | Branch Start |
| NXB | Next Branch Start |
| BND | Branch End |
| MCR | Master Control Relay |
| AFI | Always False Instruction |
| IRD | Invert Rung Decision |
| END | End of Program |

TABLE I-continued

| RELAY LOGIC INSTRUCTIONS | EXPLANATION |
| --- | --- |
| SOR | Start Of Rung |
| LNK | Link |
| CMT | Comment |
| SIZ | Start of Insert Zone |
| SRZ | Start of Replace Zone |
| SDZ | Start of Delete Zone |

These instructions are well known in the art as are their implementation in hardware, and generally provide for the testing of memory bits and the setting of the rung true flag depending on the outcome of those bits. A set of timer/counter instructions are also provided in which hardware timers may be turned on and off and their values read and compared to alarm values. The branch start, next branch start and branch end instructions also known within this art provide for branches in the relay ladder rungs such as produce parallel connections of relay contacts. Generally these branch instructions denote whether the contact instructions set a primary rung true flag or branch rung true flag (with the primary rung true flag pushed on a stack) for new branches which must later be combined as a logical OR with the primary rung true flag.

The present invention also provides for a set of miscellaneous relay logic instructions including "master control relay" which essentially deactivates selected rungs of the ladder program. The "always false" instruction directly sets the rung true flag to false unconditionally; the "start of rung" instruction sets the rung true flag to true prior to the execution of t rung. The "invert rung decision" instruction sets the rung true flag to the opposite of its current state, the "link" instruction which allows limited branching, the "comment" instruction which allows the insertion of an ASCII comment field and the SIZ, SRZ and SDZ instructions which are described in co-pending application Industrial Controller Permitting Program Editing During Program Execution, Ser. No. 08/551,441, filed Nov. 1, 1995, hereby incorporated by reference and which allow editing of the relay ladder logic while it is operating.

Similarly the ALRLU 68 allows for conventional RISC instruction set provided in Table II which are well understood in the art using standard mnemonics. As can be seen, the arithmetic and logical instructions are reduced so as to be even fewer in number than the relay logic instructions.

TABLE II

| ARITHMETIC/LOGIC INSTRUCTIONS | EXPLANATION |
| --- | --- |
| NOP | No Operation |
| SXD | Sign Extend |
| CMP | Compare for cc |
| SFT | Shitt (32 or 64 bits) |
| Orn | Logical Ornot |
| FLO | Find Leading One |
| ADC | Add Integer with Carry |
| SBC | Subtract Integer with Carry |
| AND | Logical AND |
| ANDn | Logical ANDnot |
| XOR | Logical XOR |
| OR | Logical OR |
| ADD | Add Integer |
| SUB | Subtract Integer |

The present invention provides two types of arithmetic/logic instructions distinguished by a single bit in the instruction field. These two types of instructions are "normal" and "user" and are distinguished principally by which of the two sets of condition code flags are affected by the operation of the instruction. Normal instructions will not affect the user flags and thus will not disturb the user's program. The purpose of these instructions is to allow the machine to perform computation that invisible to the user and that do not interfere with the user's program. User instructions also differ from normal instructions in that they are conditional on the rung true flag. If the rung flag is true, a user arithmetic or logic instruction updates both the normal and user condition code flags. If the rung true flag is false, the user compute does not execute and both the normal and user condition code flags remain unchanged. This effectively makes all of the arithmetic and logical instructions hybrid instructions in which arithmetic/logic instructions can depend on relay ladder instructions. The use of two levels of condition codes allows arithmetic procedures (for example software floating point routines) which affect the normal condition codes to be nested within other user instructions without the nested instructions affecting the user condition codes. It also allows suppression of arithmetic and logical instructions associated with a rung eliminating spurious changes to the condition codes.

The ALRLU 68 also provides control transfer instructions which allow for branching as is understood in the art and typically used in conventional computer architectures. Included in the branch instructions is a branch on condition instruction, Bcc, which causes a branch based on the status of the condition code registers (standard flags being part of the registers 46). The operand of the Bcc instruction defines a relative branch by incrementing the program counter 48 by the relative branch amount if a condition code matches the condition of the operand of this instruction. Other control transfer group instructions are provided as indicated in the following table.

TABLE III

| BRANCHING INSTRUCTIONS | EXPLANATION |
| --- | --- |
| DBcc | Decrement & Branch When Count Is Not Zero & Condition Code Is True |
| Bcc | Relative branch on condition code |
| BRIcc | Branch conditionally on indirect address |
| BRP | Branch Physical |
| BPMF | Branch Physical on Rung True false |

The branch instruction in the present invention differs significantly from the standard branch instructions provided in arithmetic processors in that one condition code on which a branch may be predicated is the rung true flag. Thus a branch may be triggered by whether or not the rung true flag has been set by the previous relay logic instruction or not as opposed to whether a condition code (such as overflow) has been set by a previous arithmetic instruction. In this way, further linkage between the RISC and relay ladder instruction sets is provided.

A second hybrid instruction is found in the load store group of instruction provided in the following Table IV.

TABLE IV

| LOAD/STORE GROUP | EXPLANATION |
|---|---|
| LDB | Load Byte |
| STB | Store Byte |
| STH | Store Half Word |
| LDM | Load Multiple Registers |
| STM | Store Multiple Registers |
| LDID | Load 16 Bit Immediate Data |
| LDIA | Load Immediate Address |
| LDW | Load Word |
| STW | Store Word |

These instructions provide for a writing or reading of data between the memory 22 and registers 46. In the present invention, however, the "store half word" and "store word instructions" store data to data memory 22 contingent on the outcome of a previous relay ladder logic instruction.

The above description has been that of a preferred embodiment of the present invention. It will occur to those that practice the art that many modifications may be made without departing from the spirit and scope of the invention. For example the electronic processor of the present invention may be used with a co-processor providing additional non-RISC instructions for instances where complex mathematical calculations need be performed either within or outside the stream of the major control thread of the program. The Harvard architecture, while preferred is not necessary and a single memory for data and instructions may be used. In order to apprise the public of various embodiments that may fall within the scope of the invention the following claims are made.

We claim:

1. An integrated circuit electronic computer comprising:

address and data lines connectable to memory for exchanging data on the data lines at a memory address corresponding to an address on the address lines;

instruction decoding circuit attached to the data lines for receiving an instruction therefrom and providing decoded instruction signals;

a plurality of storage registers communicating with the address and data lines and the instruction decoding circuit to receive and transmit data from and to the data lines;

an arithmetic/logic/relay ladder unit connected to the storage registers, the data lines, and the instruction decoding circuit for receiving data from at least one register to operate on that data, according to an instruction signal, to produce an output;

wherein the arithmetic/logic/relay ladder unit operates on the data according to different instruction signals to execute arithmetic instructions, logic instructions and relay ladder instructions;

wherein the integrated circuit electronic computer further includes a program counter communicating with the address lines to provide a fetch address from external memory where a next instruction will be found, and wherein the program counter is conditionally altered in response to an instruction signal to produce a branch in execution of instructions upon a condition based on the output of the arithmetic/logic/relay ladder unit's execution of an earlier relay ladder instruction.

2. The integrated circuit electronic computer of claim 1 wherein the arithmetic instructions are selected from the group consisting of: ADD and SUBTRACT.

3. The integrated circuit electronic computer of claim 1 wherein the logic instructions are selected from the group consisting of: AND and OR, and EXCLUSIVE OR.

4. The integrated circuit electronic computer of claim 1 wherein the relay ladder instructions are selected from the group consisting of: EXAMINE IF CLOSED, EXAMINE IF OPEN, TIMER ON, TIMER OFF, START OF RUNG, BRANCH START, NEXT BRANCH START, BRANCH END, OUTPUT ENABLE, OUTPUT LATCH and OUTPUT UNLATCH.

5. The integrated circuit electronic computer of claim 1 wherein the instruction decoding circuit is a portion of an instruction pipeline providing control signals for simultaneous fetching of a first instruction over the data lines, decoding of a second instruction to produce an instruction signal and executing the third instruction by the arithmetic/logic/relay ladder unit.

6. An integrated circuit electronic computer comprising:

address and data lines connectable to memory for exchanging data on the data lines at a memory address corresponding to an address on the address lines;

instruction decoding circuit attached to the data lines for receiving an instruction therefrom and providing decoded instruction signals;

a plurality of storage registers communicating with the address and data lines and the instruction decoding circuit to receive and transmit data from and to the data lines;

an arithmetic/logic/relay ladder unit connected to the storage registers, the data lines, and the instruction decoding circuit for receiving data from at least one register to operate on that data, according to an instruction signal, to produce an output;

wherein the arithmetic/logic/relay ladder unit operates on the data according to different instruction signals to execute arithmetic instructions, logic instructions and relay ladder instructions;

wherein the instruction decode circuitry may communicate an instruction signal to a register causing the register to conditionally provide data to the data lines for storage in the external memory based on the output of the arithmetic/logic/relay ladder unit from an earlier relay ladder instruction.

7. The integrated circuit electronic computer of claim 6, wherein the arithmetic instructions are selected from the group consisting of: ADD and SUBTRACT.

8. The integrated circuit electronic computer of claim 6 wherein the logic instructions are selected from the group consisting of: AND and OR, and EXCLUSIVE OR.

9. The integrated circuit electronic computer of claim 6 wherein the relay ladder instructions are selected from the group consisting of: EXAMINE IF CLOSED, EXAMINE IF OPEN, TIMER ON, TIMER OFF, START OF RUNG, BRANCH START, NEXT BRANCH START, BRANCH END, OUTPUT ENABLE, OUTPUT LATCH and OUTPUT UNLATCH.

10. The integrated circuit electronic computer of claim 6 wherein the instruction decoding circuit is a portion of an instruction decoding circuit is a portion of an instruction pipeline providing control signals for simultaneous fetching of a first instruction over the data lines, decoding of a second instruction to produce an instruction signal and executing the third instruction by the arithmetic/logic/relay ladder unit.

11. An integrated circuit electronic computer comprising:

address and data lines connectable to memory for exchanging data on the data lines at a memory address corresponding to an address on the address lines;

instruction decoding circuit attached to the data lines for receiving an instruction therefrom and providing decoded instruction signals;

a plurality of storage registers communicating with the address and data lines and the instruction decoding circuit to receive and transmit data from and to the data lines;

an arithmetic/logic/relay ladder unit connected to the storage registers, the data lines, and the instruction decoding circuit for receiving data from at least one register to operate on that data, according to an instruction signal, to produce an output;

wherein the arithmetic/logic/relay ladder unit operates on the data according to different instruction signals to execute arithmetic instructions, logic instructions and relay ladder instructions;

including first and second condition code registers having flags set by the operation of the arithmetic instructions, wherein the arithmetic instructions may be designated to change the flags of the first condition code register only.

12. The integrated circuit electronic computer of claim 11, wherein the arithmetic instructions are selected from the group consisting of: ADD and SUBTRACT.

13. The integrated circuit electronic computer of claim 11 wherein the logic instructions are selected from the group consisting of: AND and OR, and EXCLUSIVE OR.

14. The integrated circuit electronic computer of claim 11 wherein the relay ladder instructions are selected from the group consisting of: EXAMINE IF CLOSED, EXAMINE IF OPEN, TIMER ON, TIMER OFF, START OF RUNG, BRANCH START, NEXT BRANCH START, BRANCH END, OUTPUT ENABLE, OUTPUT LATCH and OUTPUT UNLATCH.

15. The integrated circuit electronic computer of claim 11 wherein the instruction decoding circuit is a portion of an instruction decoding circuit is a portion of an instruction pipeline providing control signals for simultaneous fetching of a first instruction over the data lines, decoding of a second instruction to produce an instruction signal and executing the third instruction by the arithmetic/logic/relay ladder unit.

* * * * *